United States Patent [19]
Wende

[11] 3,971,699

[45] July 27, 1976

[54] NEUTRONIC REACTOR

[75] Inventor: Charles W. J. Wende, West Chester, Pa.

[73] Assignee: The United States of America as represented by the United States Energy Research and Development Administration, Washington, D.C.

[22] Filed: June 19, 1952

[21] Appl. No.: 294,349

[52] U.S. Cl. .................................................. 176/52
[51] Int. Cl.² ........................................ G21C 15/02
[58] Field of Search ..................... 204/154.2; 176/52

[56] References Cited
UNITED STATES PATENTS

| | | | |
|---|---|---|---|
| 2,708,656 | 5/1955 | Fermi et al. ........................ | 204/193 |
| 2,744,064 | 5/1956 | Moore ............................ | 204/193.32 |
| 2,780,596 | 5/1957 | Anderson ....................... | 204/193.32 |

OTHER PUBLICATIONS

Physics To–Day, Jan. 1, 1951, pp. 6–11, (an article by Borst).

Nucleonics, Jan. 1950, pp. 17 and 25 (part of an article by Ohlinger).

Atomics, June 1951, pp. 176–180 (an article on BEPO).

Atomics, Feb. 1951, pp. 51–56 (an article on Gleep).

Primary Examiner—H. E. Behrend
Attorney, Agent, or Firm—Dean E. Carlson; Arthur A. Churm; Marshall Burmeister

EXEMPLARY CLAIM

1. The method of operating a water-cooled neutronic reactor having a graphite moderator which comprises flowing a gaseous mixture of carbon dioxide and helium, in which the helium comprises 40–60 volume percent of the mixture, in contact with the graphite moderator.

2 Claims, 4 Drawing Figures

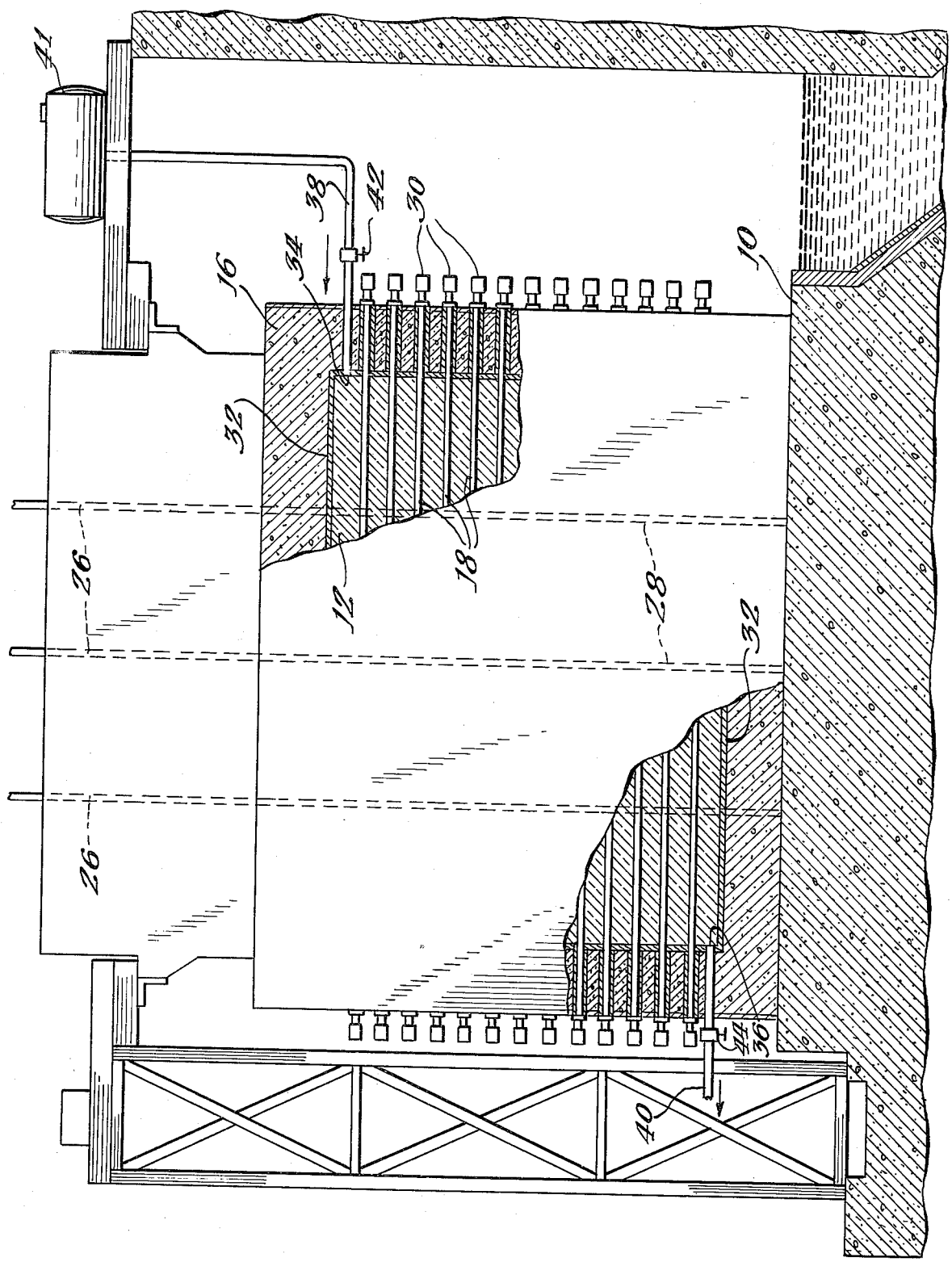

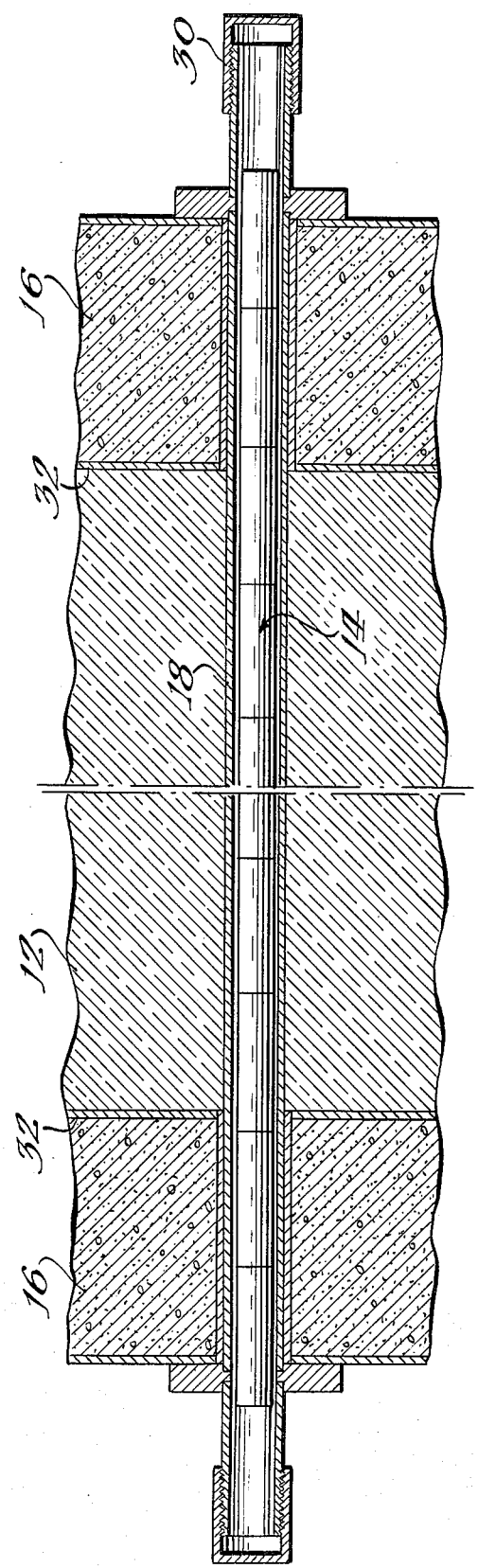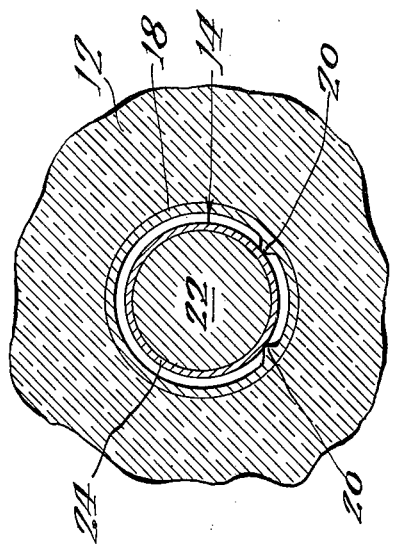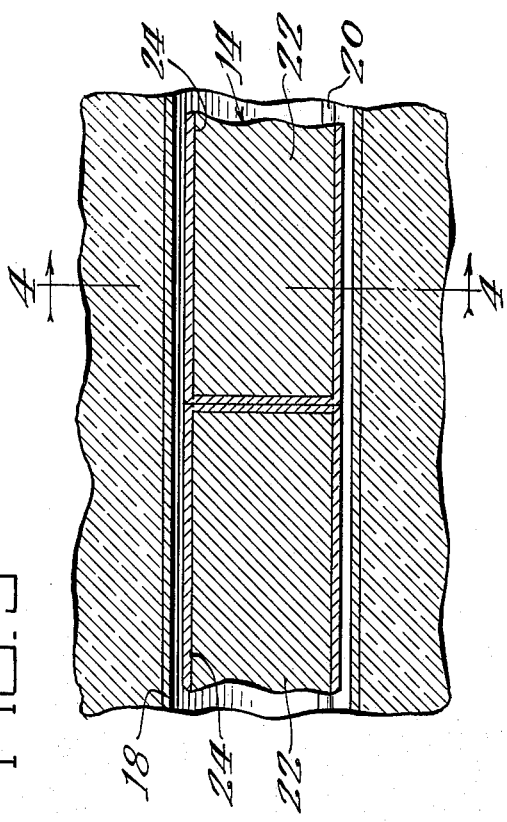

NEUTRONIC REACTOR

The present invention relates to neutronic reactors with solid moderators, and to methods of operating such reactors which minimize the deleterious effect of high energy neutron bombardment of the moderator over prolonged periods of time.

It has been found that prolonged operation of a neutronic reactor with a solid moderator will cause changes in the physical properties of the material of the moderator, particularly when the reactor is operated at a relatively high power level. Among the changes which occur in the moderator, expansion presents the most immediate problems, since distortion of the shape of the reactor limits the life of the reactor. Extruded moderator materials expand normal to the axis of the extrusion of the material. For this reason, spaces have been provided adjacent to blocks of moderator material on the sides parallel to the axis of extrusion, as described in the copending application of John T. Carleton, Ser. No. 157,287, filed Apr. 21, 1950 now U.S. Pat. No. 3,200,046 dated Aug. 10, 1965.

The changes in the physical properties of solid materials as a result of prolonged high energy neutron bombardment are believed to be due to distortion of the crystalline lattice of such materials. When a high energy neutron strikes one of the atoms of a crystal, the bonds which tie the atoms of the crystal together are placed under severe strain, and under certain conditions one of the atoms will be displaced from its position in the lattice structure. This may merely cause rearrangement of the atoms in the lattice structure of the crystal, or it may result in the bombarded atom entirely leaving the lattice structure and taking up a permanent interstitial position. This latter process is believed to be the one which occurs when crystalline materials are expanded by neutron bombardment.

It has been found, that the expansion of crystalline materials under neutron bombardment may be minimized if the crystalline materials are maintained at a sufficiently high temperature in order to facilitate "self-healing." Self-healing is the process which occurs when the temperature at which the bombarded crystalline material is maintained sufficiently high to facilitate atoms in resuming the normal crystalline lattice structure. This method of curing the deformations in a crystalline substance was first discovered by Eugene P. Wigner, and described in the copending patent application, Ser. No. 605,958, filed July 19, 1945 now abandoned. A neutronic reactor constructed with a solid crystalline moderator which minimizes the moderator expansion by means of self-healing is disclosed in the copending patent application of Alfred A. Johnson and John T. Carleton, Ser. No. 253,908, filed Oct. 30, 1951.

The present invention retards the expansion of the solid crystalline materials under neutron bombardment by maintaining the crystalline material in a fluid atmosphere of a fluid selected to have a thermal conductivity which reduces the heat transfer from the crystalline moderator material to whatever coolant medium is present, thereby increasing the temperature of the crystalline material. As a result, the rate of thermal self-healing will be increased.

It is thus an object of the present invention to provide a neutronic reactor with a solid crystalline moderator in which expansion of the moderator is decreased or inhibited.

It is also an object of the present invention to provide a method of operating neutronic reactors with crystalline moderators which will decrease or minimize the expansion of the moderator.

Further objects and advantages of the present invention will become readily apparent to the man skilled in the art upon a further reading of the specification and claims, particularly when viewed in the light of the drawings, in which:

FIG. 1 is an elevational view, partly cut away and in section, of a neutronic reactor constructed according to the teachings of the present invention;

FIG. 2 is a fragmentary enlarged sectional view of a portion of the neutronic reactor shown in FIG. 1;

FIG. 3 is a further enlargement of a fragment of the portion of the reactor shown in FIG. 2; and FIG. 4 is a sectional view of a portion of the neutronic reactor taken along line 4—4 of FIG. 3.

The neutronic reactor is constructed upon a concrete base 10, and generally includes a moderator 12 in which fuel elements 14 are disposed, and a shield 16 surrounding the moderator 12. A plurality of parallel coolant tubes 18 traverse the moderator 12, and the fuel elements 14 are slidably disposed upon ribs 20 within the coolant tubes 18.

The fuel elements 14 comprise bodies 22 of material fissionable by neutrons of thermal energy encased in a protective jacket 24. A suitable material for the jacket 24 is aluminum, and the thermal neutron fissionable material 22 may be natural uranium, or in the event that it is not desired to convert material to fissionable material, a composition composed of 1 part $U^{235}$ to 139 parts of thallium.

Control rods 26 are slidably disposed within wells 28 extending through the moderator 12 of the reactor in order to control the neutronic reaction, as is well known in the art. The coolant tubes 18 are provided with caps 30 at the end thereof, and a fluid coolant, generally water may be flown through the tubes 18 in order to cool the fuel elements 14 and the moderator 12 in a conventional manner. A gas-tight envelope 32 is disposed between the moderator 12 and the shield 16 and prevents the ambient atmosphere from infiltrating into the moderator 12 of the reactor. The coolant channels 18 pierce the envelope 32, and are sealed thereto.

The gas enclosure 32 is provided with a pair of apertures 34 and 36 on opposite sides of the reactor in order to introduce the gas into the moderator 12. The one aperture 34 is adjacent to the top of the reactor, and the other aperture 36 is adjacent to the bottom of the reactor, as shown in FIG. 1. Pipes 38 and 40 having valves 42 and 44 are sealed to the apertures 34 and 36, the pipe 38 being connected to a source 41 of gas with the moderator material, and the pipe 40 providing an outlet for the gases from the reactor.

In the particular construction of the reactor described, the coolant tubes 18 are spaced from adjacent tubes by 8⅜ inches. The tubes 18 are constructed of aluminum with an inner diameter of approximately 1.611 inches and an outer diameter of approximately 1.729 inches. A water coolant may be flown through the channels 18. The fuel elements are approximately 1.44 inches in diameter, the outer jacket 24 being approximately 0.028 inch of aluminum and the inner fissionable body 22 being of natural uranium. The moderator 12 is constructed of graphite, forming a cube 25 feet on a side.

The copending patent application of Enrico Fermi and Leo Szilard, Ser. No. 568,904, filed Dec. 19, 1944, now U.S. Pat. No. 2,708,656, issued May 17, 1955, discloses a reactor constructed in a manner similar to the reactor described above, and describes the nuclear principles of its operation in greater detail.

Carbon dioxide may be introduced into the moderator material through the pipe 38 and exhausted through the pipe 40. Carbon dioxide and carbon react according to the equation $$C + CO_2 = 2\ CO.$$

In order to minimize the deterioration of the moderator, an inert gas is mixed with the reactive gas. Mixtures of helium or carbon monoxide and carbon dioxide have been found to be particularly suitable. A concentration of 40 to 60 percent carbon dioxide by volume with helium under standard conditions of pressure and temperature appears to adequately retard the deterioration of the graphite while inhibiting graphite expansion satisfactorily.

It is also to be noted, that carbon monoxide will react with carbon dioxide to form carbon, since the chemical equations above are reversible at suitable temperatures. It has been found that small quantities of carbon monoxide in the carbon dioxide circulated through a graphite moderator of a reactor will also inhibit the deterioration of the graphite described above.

The man skilled in the art will readily devise many other modifications and embodiments of the present invention as a result of reading the foregoing disclosure. Hence, it is intended that the scope of the present invention be not limited by the foregoing disclosure, but rather only by the appended claims.

What is claimed is:

1. The method of operating a water-cooled neutronic reactor having a graphite moderator which comprises flowing a gaseous mixture of carbon dioxide and helium, in which the helium comprises 40–60 volume per cent of the mixture, in contact with the graphite moderator.

2. The method of operating a neutronic reactor having fuel elements composed of a material fissionable by thermal neutrons disposed in coolant tubes extending through a graphite moderator comprising flowing water through the said coolant tubes to remove heat from the fuel elements, and partially insulating the moderator from the coolant by circulating a gaseous fluid at least principally composed of carbon dioxide through the graphite outside of the coolant tubes so that the cooling effect of the water on the graphite is insufficient to prevent thermal healing of the graphite.

* * * * *